(12) United States Patent
De'Longhi et al.

(10) Patent No.: US 11,583,132 B2
(45) Date of Patent: Feb. 21, 2023

(54) DEVICE FOR PRESSING A DOSE OF GROUND COFFEE POWDER

(71) Applicant: De'Longhi Appliances S.R.L., Treviso (IT)

(72) Inventors: Giuseppe De'Longhi, Treviso (IT); Giovanni Rossetto, Treviso (IT); Maurizio Casasola, Treviso (IT); Massimo Poggioli, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 511 days.

(21) Appl. No.: 16/635,735

(22) PCT Filed: Jul. 25, 2018

(86) PCT No.: PCT/EP2018/070235
§ 371 (c)(1),
(2) Date: Jan. 31, 2020

(87) PCT Pub. No.: WO2019/025268
PCT Pub. Date: Feb. 7, 2019

(65) Prior Publication Data
US 2021/0120998 A1    Apr. 29, 2021

(30) Foreign Application Priority Data
Aug. 3, 2017 (IT) .......................... 102017000090275

(51) Int. Cl.
*A47J 31/06* (2006.01)
*A47J 31/42* (2006.01)
*A47J 31/44* (2006.01)

(52) U.S. Cl.
CPC .......... *A47J 31/0663* (2013.01); *A47J 31/42* (2013.01); *A47J 31/4407* (2013.01); *A47J 2201/00* (2013.01)

(58) Field of Classification Search
CPC .... A47J 31/0663; A47J 31/42; A47J 31/4407; A47J 31/44; A47J 2201/00
See application file for complete search history.

(56) References Cited

U.S. PATENT DOCUMENTS

| | | | |
|---|---|---|---|
| 2013/0167729 A1* | 7/2013 | Hoare ................. | A47J 31/4464 99/287 |
| 2014/0356502 A1* | 12/2014 | Goeltenboth ....... | A47J 31/0689 426/433 |
| 2016/0128507 A1 | 5/2016 | Grassia et al. | |

FOREIGN PATENT DOCUMENTS

| CN | 201067340 Y | * | 6/2008 |
|---|---|---|---|
| EP | 1654968 A1 | | 5/2006 |

(Continued)

OTHER PUBLICATIONS

English translate (CN201067340Y), retrieved date Jul. 22, 2022.*

(Continued)

*Primary Examiner* — Shelley M Self
*Assistant Examiner* — Mohammed S. Alawadi
(74) *Attorney, Agent, or Firm* — Blank Rome LLP

(57) ABSTRACT

A device (2) for pressing a dose of ground coffee powder includes a filter holder cup (3) having a filter (4) for depositing the dose of ground coffee powder, an attaching support (7) in which the cup (3) is separably attached, a grinder (8) for coffee beans including a slide (9) for dispensing ground coffee having an outlet (10) positioned above the mouth (5) of the cup (3), a pressing piston (15) for pressing the dose of ground coffee powder present in the filter (4) mounted in the cup (3), and a lifting mechanism for lifting the pressing piston (15) in a position above the outlet (10) of the slide (9).

13 Claims, 8 Drawing Sheets

(56) References Cited

FOREIGN PATENT DOCUMENTS

EP   1867257 A1   12/2007
EP   2892403 A1   7/2015

OTHER PUBLICATIONS

Measurement of Force and Torque, retrieved date Jul. 22, 2022. http://www.industrial-electronics.com/DAQ/transducers_20-0.html.*
International Search Report dated Sep. 25, 2018; International Application No. PCT/EP2018/070235; International Filing Date: Jul. 25, 2018; 5 pages.
Written Opinion dated Sep. 25, 2018; International Application No. PCT/EP2018/070235; International Filing Date: Jul. 25, 2018; 7 pages.
English translation; European Published Application No. EP1654968; Publication Date: May 10, 2006; 17 pages.

* cited by examiner

DEVICE FOR PRESSING A DOSE OF GROUND COFFEE POWDER

RELATED APPLICATIONS

This application is a U.S. national phase application of International Application No. PCT/EP2018/070235, filed Jul. 25, 2018; which application claims priority to Italy Application No. 102017000090275, filed Aug. 3, 2017. Each of the above-identified related applications are incorporated by reference.

FIELD OF USE

The present invention refers to a device for pressing a dose of ground coffee powder which is ready for brewing.

BACKGROUND OF THE INVENTION

Proper pressing of an exact dose of ground coffee prior to pressure-brewing is essential for obtaining an espresso coffee with the desired organoleptic properties.

Various solutions are available on the market for this purpose, including manual coffee tampers or more or less automated systems that can even calibrate the pressing force with an adjustable fixed setting a priori and not during the pressing step itself.

Frequently, these systems do not solve the problem of the coffee powder being scattered out of the filter holder cup because the pressing process requires the filter holder cup to be moved from the ground coffee collection area to the pressing area.

The US patent 2016/0128507 referring to a motorized auger with a vertical axis is also known and it presses the ground coffee powder. The auger has its tamping head positioned under the exit opening of the chute for delivery of the coffee powder in the filter holder cup. Activation of the auger, which is simultaneous with the activation of the grinder, is determined by a microswitch, which switches as a result of the coupling of the filter holder cup with its support, and continues for a certain amount of time after the grinding has stopped, so as to ensure compaction of the coffee powder. More precisely, the auger is activated when the guides of the female bayonet mechanism provided by said support are engaged by the external tabs of the filter holder cup. In this solution, it can happen that part of the ground coffee accumulates in the interstices between the threads of the auger and comes out when the filter holder cup is extracted, and thus scatters in the area, or that part of the ground coffee deposits in the interstices between the threads of the auger and is used only in the subsequent brewing cycle, which, however, may take place even much later, thus causing deterioration of the properties of the ground coffee.

SUMMARY OF THE INVENTION

The technical task of the present invention is therefore to realize a device for pressing a dose of ground coffee powder ready for brewing and that makes it possible to eliminate the cited technical drawbacks of the prior art.

Within the scope of this technical task, one aim of the invention is to realize a device of the above-mentioned type that is adapted to simplify and accelerate the process of pressing the ground coffee that is present in the filter holder cup.

Another aim of the invention is to realize a device of the above-mentioned type that is adapted to compress the ground coffee without having to move the filter holder cup with respect to its position for engagement in its support in the machine and in which it receives the ground coffee from the dispensing slide of the grinder present in the machine.

Another aim of the invention is to realize a device of the above-mentioned type that is adapted to reduce or eliminate the scattering of ground coffee powder outside of the filter holder cup.

Another aim of the invention is to realize a device of the above-mentioned type that is adapted to perform uniform pressing of the ground coffee so as to prevent the formation of preferential paths of the brewing liquid through the coffee powder.

Another aim of the invention is to realize a device of the above-mentioned type that is adapted to regulate the pressing process so as to be able to adjust it to the type of beverage desired without having to preset the system prior to performing the pressing process.

Another aim of the invention is to realize a device of the above-mentioned type that is adapted to perform pressing without rubbing/heating the coffee so as not to alter its aroma.

Another aim of the invention is to realize a device of the above-mentioned type that is adapted to perform pressing that does not alter the amount of ground coffee.

Another aim of the invention is to realize a device of the above-mentioned type that is incorporated in a coffee machine.

The technical task reported above, as well as the latter and other aims, according to the present invention, are achieved by realizing a device for pressing a dose of ground coffee powder comprising a filter holder cup having a filter for the introduction and collection of said dose of ground coffee powder, an attaching support to which said cup is separably attached and a grinder for coffee beans comprising a slide for dispensing ground coffee having an outlet positioned above said filter of said cup, characterised in that it comprises a pressing piston for pressing said dose of ground coffee powder present in said cup, and a lifting mechanism for lifting said pressing piston in a position above said outlet of said slide.

Advantageously, said lifting mechanism reversibly activates said piston between a pressing position, in which said piston is internal to said filter holder cup, and said position above said outlet of the slide.

Advantageously, a guide is provided for the vertical translation of said piston.

Advantageously, a pressing force adjustment means is also provided.

Advantageously, said lifting means also comprises a rotating control element and a transmission which transforms the rotation of said control element in a vertical translation of said piston.

Advantageously, said adjustment means also comprises an elastic clutch which connects two elements of said pressing mechanism.

The selectable amount of the dose of ground coffee in the device is independent of the pressing force that can be selected to personalize the taste.

Advantageously, the device can be an independent unit or it can be incorporated in a coffee machine.

Advantageously, a modular coffee machine can be envisaged that is made up of structurally independent modules, one of which being formed by said device.

Other characteristics of the present invention are also defined in the claims herein below.

BRIEF DESCRIPTION OF THE DRAWINGS

Further characteristics and advantages of the invention will become more apparent from the description of a preferred, but not exclusive, embodiment of the device for pressing a dose of ground coffee powder according to the invention, which is illustrated by way of approximate and non-limiting example in the attached drawings, of which.

DETAILED DESCRIPTION OF THE ILLUSTRATED EMBODIMENTS

Figure 1:
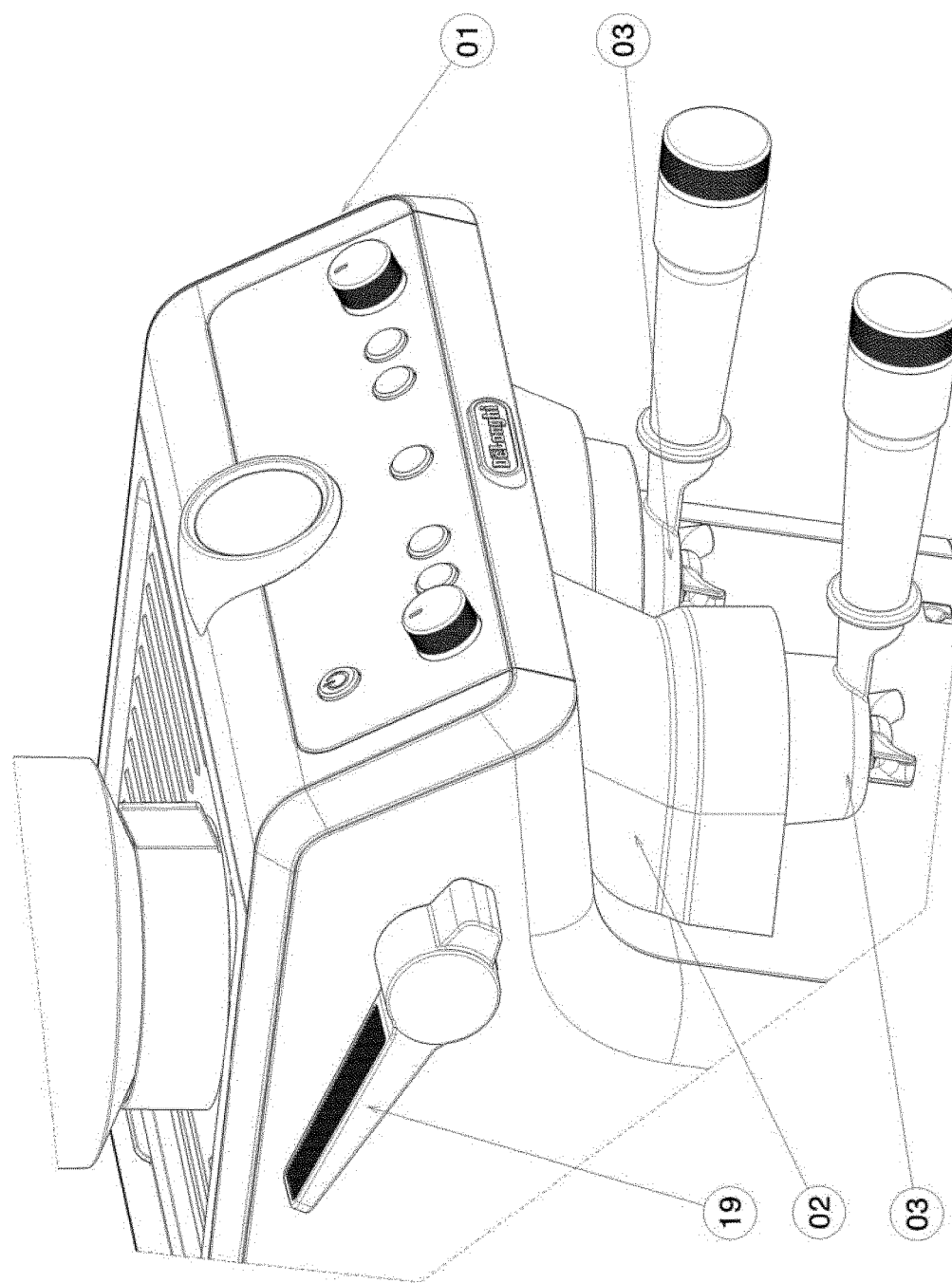
FIGS. 1-3 show a coffee machine that incorporates a device in accordance with an embodiment of the invention, with the manual control element illustrated in three different operative positions.
Figure 2:
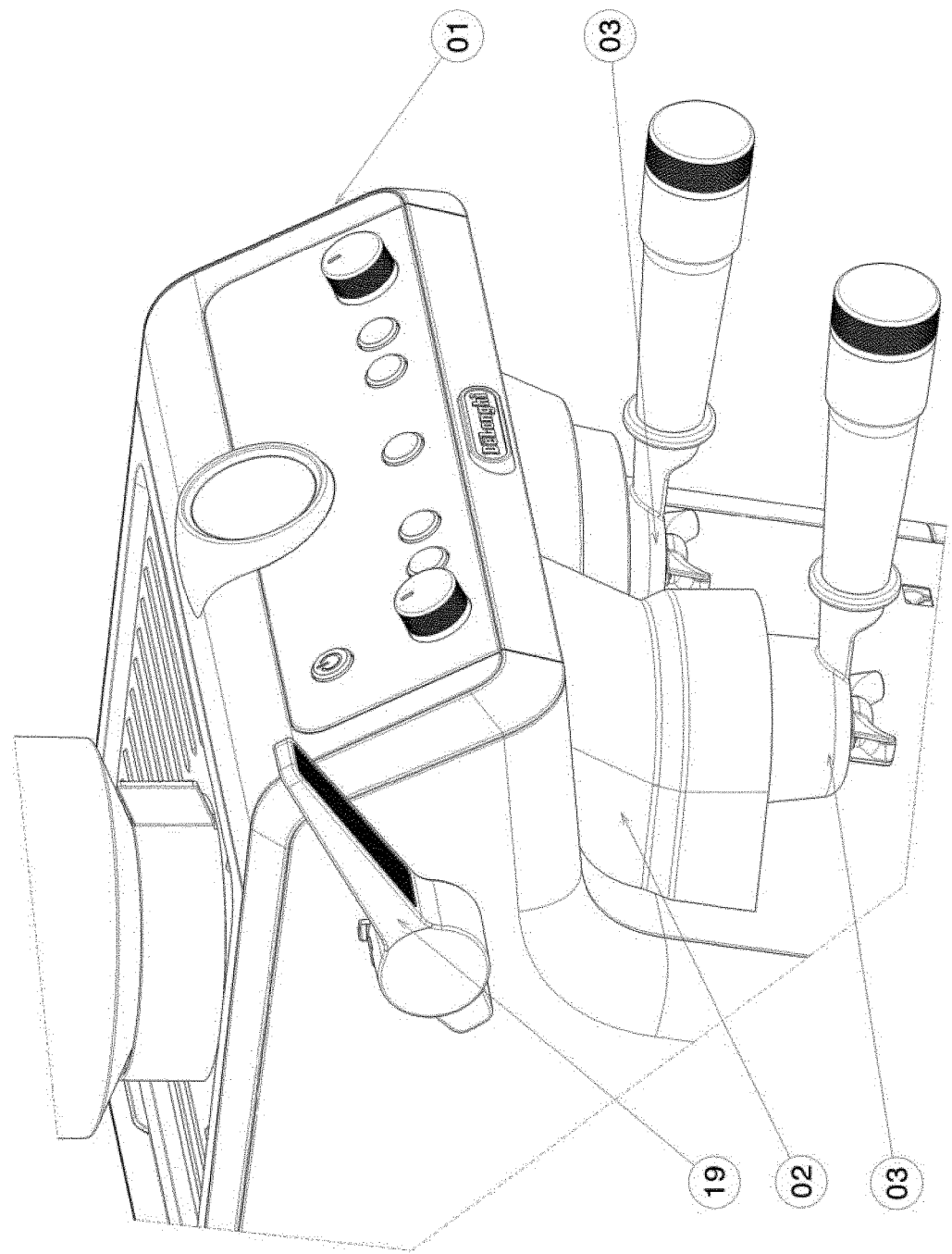
Figure 3:
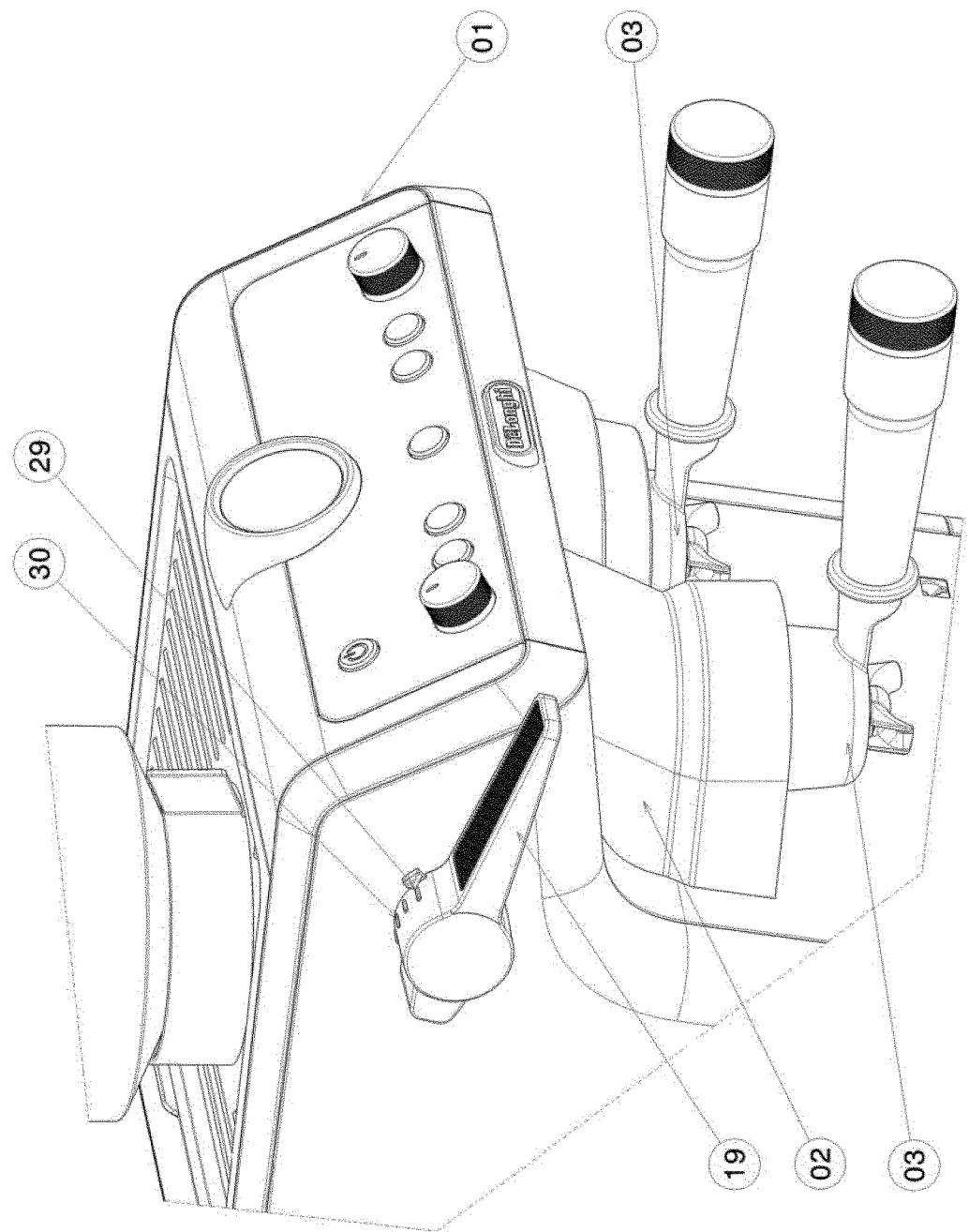

With reference to the figures, a coffee machine 1 is shown that incorporates a device 2 for pressing a dose of ground coffee powder.

The coffee machine 1 can be of modular construction made up of structurally independent modules, one of which being formed by the device 2.

In particular, the frame of the coffee machine 1 can be of modular construction, one module of which being formed by the frame of the device 2.

However, it should be noted that, unlike that which is illustrated, the device 2 can also be a structurally and functionally independent unit that is completely separated from the coffee machine 1.

The device 2 comprises a filter holder cup 3 having a filter 4 for introducing the dose of ground coffee powder.

An attaching support 7, to which the cup 3 is separably attached, is mounted in the frame 6 of the device 2.

A grinder 8 for coffee beans is also mounted in the frame 6 and it comprises a slide 9 for dispensing ground coffee having an outlet 10 positioned above the filter 4 mounted in the cup 3.

In particular, the cup 3 has a bayonet attachment system for attachment to the support 7.

The bayonet attachment system comprises external tabs 11 of the cup 3 that can be secured in specific guides 12 comprised in the support 7.

Lastly, the cup 2 has an external grip 13, and a spout 14 in the lower area for dispensing the brewed coffee.

Advantageously, the frame 6 supports a pressing piston 15 for pressing the dose of ground coffee powder dispensed in the cup 3 by the slide 9 of the grinder 8.

The piston 15 is thus capable of performing the process of pressing the dose of ground coffee powder when the cup 3 is attached to the support 7.

Therefore, the cup 3 does not need to be moved from the position for loading the dose of ground coffee powder in order to perform the pressing process.

Advantageously, the frame 6 supports a lifting mechanism for lifting the pressing piston 15 into a position above the outlet 10 of the slide 9.

In practice, the lifting mechanism reversibly activates the piston 15 between a pressing position, in which the piston 15 is inside the cup 3, and the position above the outlet 10 of the slide 9.

The frame 6 comprises a specific guide 16 for the vertical translation of the piston 15.

The piston 15 has a circular shape conjugated with respect to the filter 4 of the cup 3 so that in the pressing position, the piston 15 enters the filter 4 of the cup 3.

Dispersion of the coffee powder and cleaning of the line 16 are ensured by the scraper seal 17 that is mounted around the perimeter of the piston 15.

The translation guide 16, which, in turn, is of a shape conjugated to the piston 15, is made up of a cylindrical tube with a vertical axis and positioned coaxially above the cup 3.

Lastly, the piston 15 is rigidly supported by a stem 18 that extends vertically above the piston 15.

The lifting means comprises a rotating control element and a transmission which transforms the rotation of the control element in a vertical translation of the piston 15.

The control element is specifically a manual lever 19 or a knob, but in an alternative embodiment it can be a rotary electric motor that can be actuated by an electric controller of the device 2.

A means for adjusting the pressing force exerted by the piston 15 is also present in the device 2.

The adjustment means can also comprise an elastic clutch that connects two elements of the lifting mechanism.

In particular, the elastic clutch connects the control element to the transmission.

The elastic clutch comprises a torsion spring 23.

The transmission in this specific case comprises a gear made up of a vertical rack 20 and an arch of a cogwheel 21 supported in rotation by a horizontal mechanical axis 22.

The rack 20 is solidly constrained to the stem 18, whereas the axis 22 is connected to the control lever 19.

In further detail, the control lever 19 has a hollow body 24 in which a bearing 25 is fastened, said bearing 25 having a horizontal axis and is coupled rotatingly with a coaxial bearing sleeve 26, axially having, in turn, a seat 27 for fastening the axis 22.

The torsion spring 23, which is helical in form, is interposed with a horizontal axis between the bearing 25 and the bearing sleeve 26 and it has one end 23a fastened to the bearing 26 and one end 23b fastened to the bearing sleeve 25.

The bearing sleeve 26 is arranged through a horizontal hole 28 that passes through the thickness of an external wall of the frame.

The bearing sleeve 26 thus has one portion arranged on the internal side of the frame to which the axis 22 is connected and one portion arranged on the external side of the frame to which the bearing 25 and the control lever 19 are connected.

Lastly, the device 2 comprises an indicator of the pressing force which identifies the current configuration of the clutch.

In this specific case, the indicator is made up of a pointer 29, which is solidly constrained to the bearing sleeve 26 and projects onto the external side of the hollow body 24, as well as a graduated scale 30 applied on the external side of the hollow body 24 of the lever 19.

The device 2 has an electronic controller that coordinates its operation.

The device 2 performs a work cycle comprising in a sequence a first step of lifting the piston 15 above the outlet 10 of the slide 11, a second step of loading a dose of coffee powder in the cup 3, and a third step of lowering the piston 15 and pressing.

Figure 4:
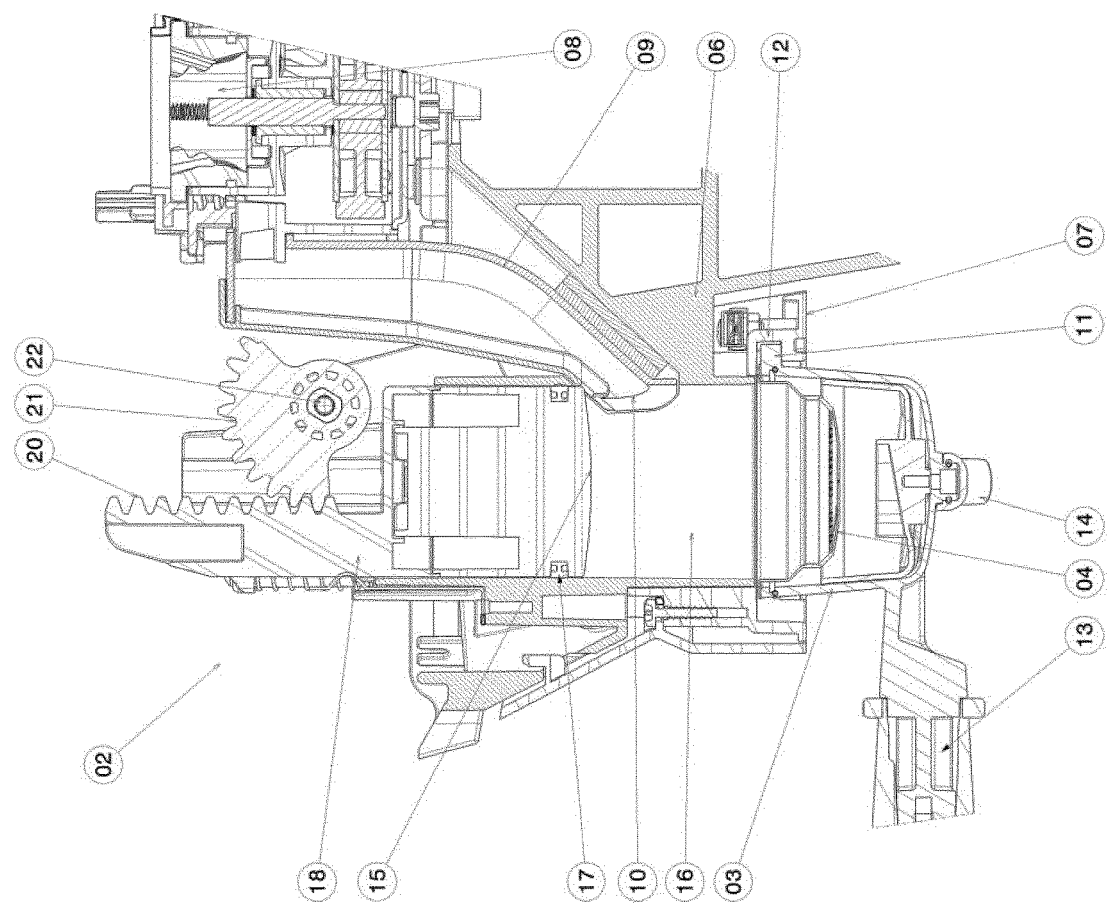
FIG. 4 shows the device with the piston raised above the outlet of the slide.
Figure 5:
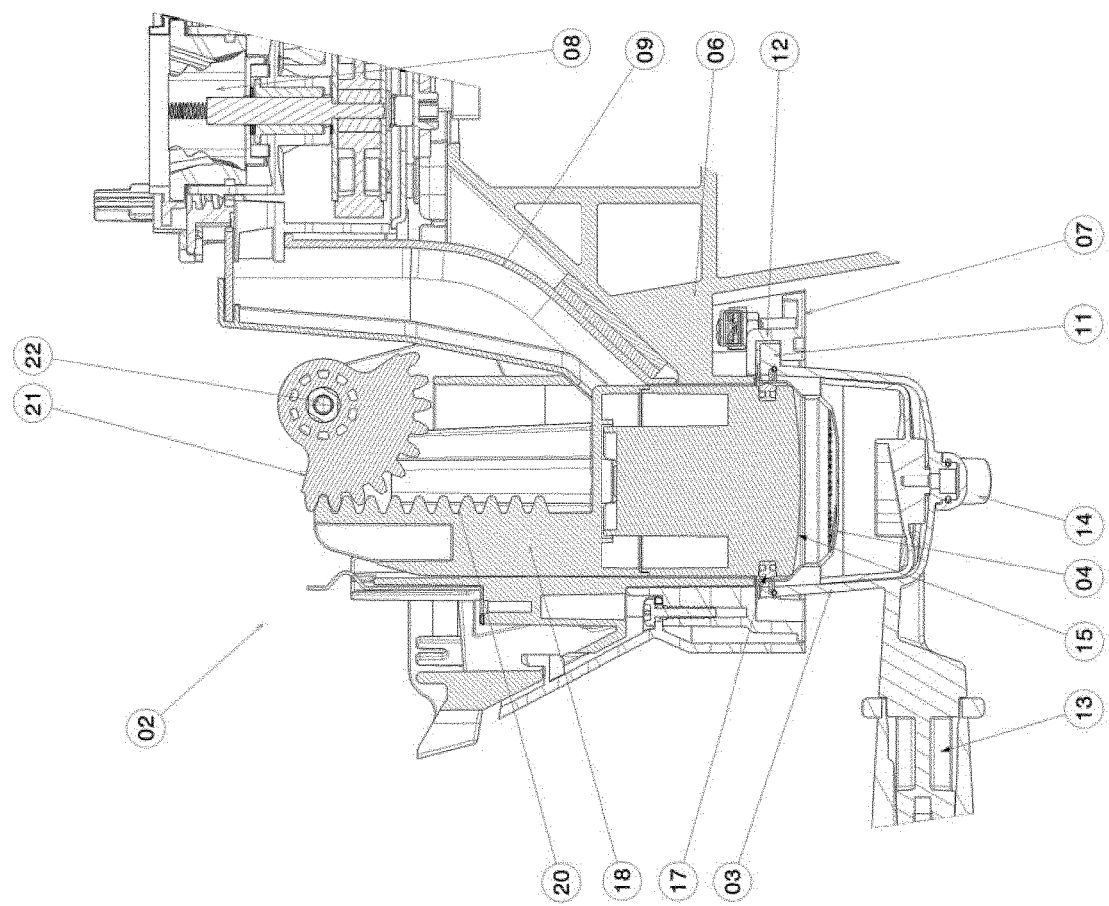
FIG. 5 shows the device with the piston inserted in the cup.
Figure 6:
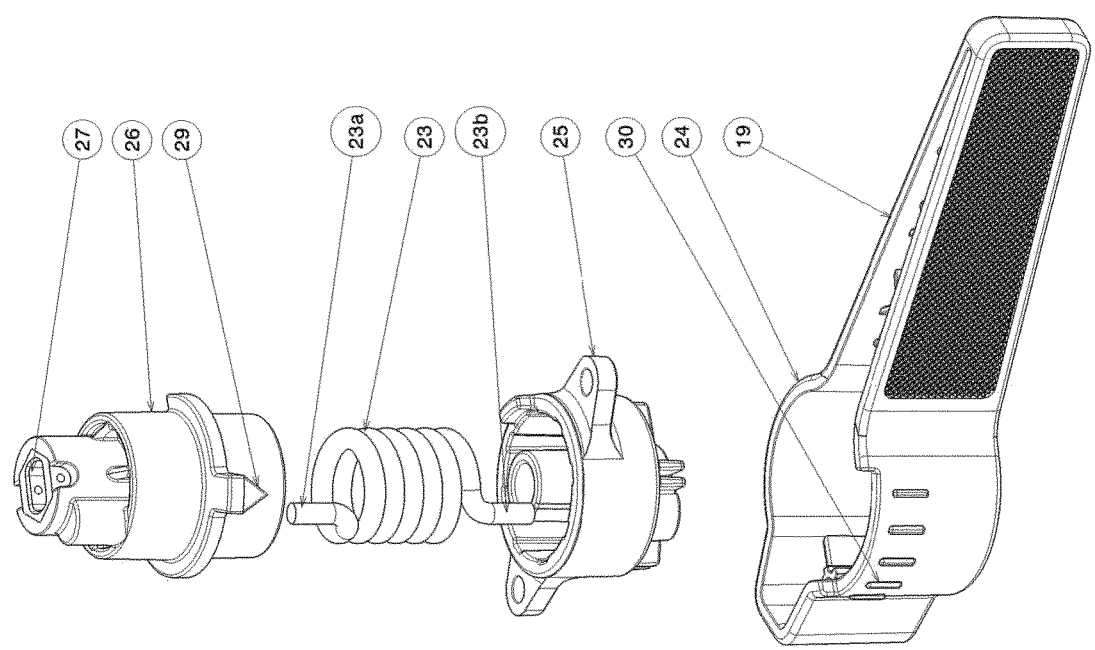
FIG. 6 is an exploded view of the manual control element.
Figure 7:
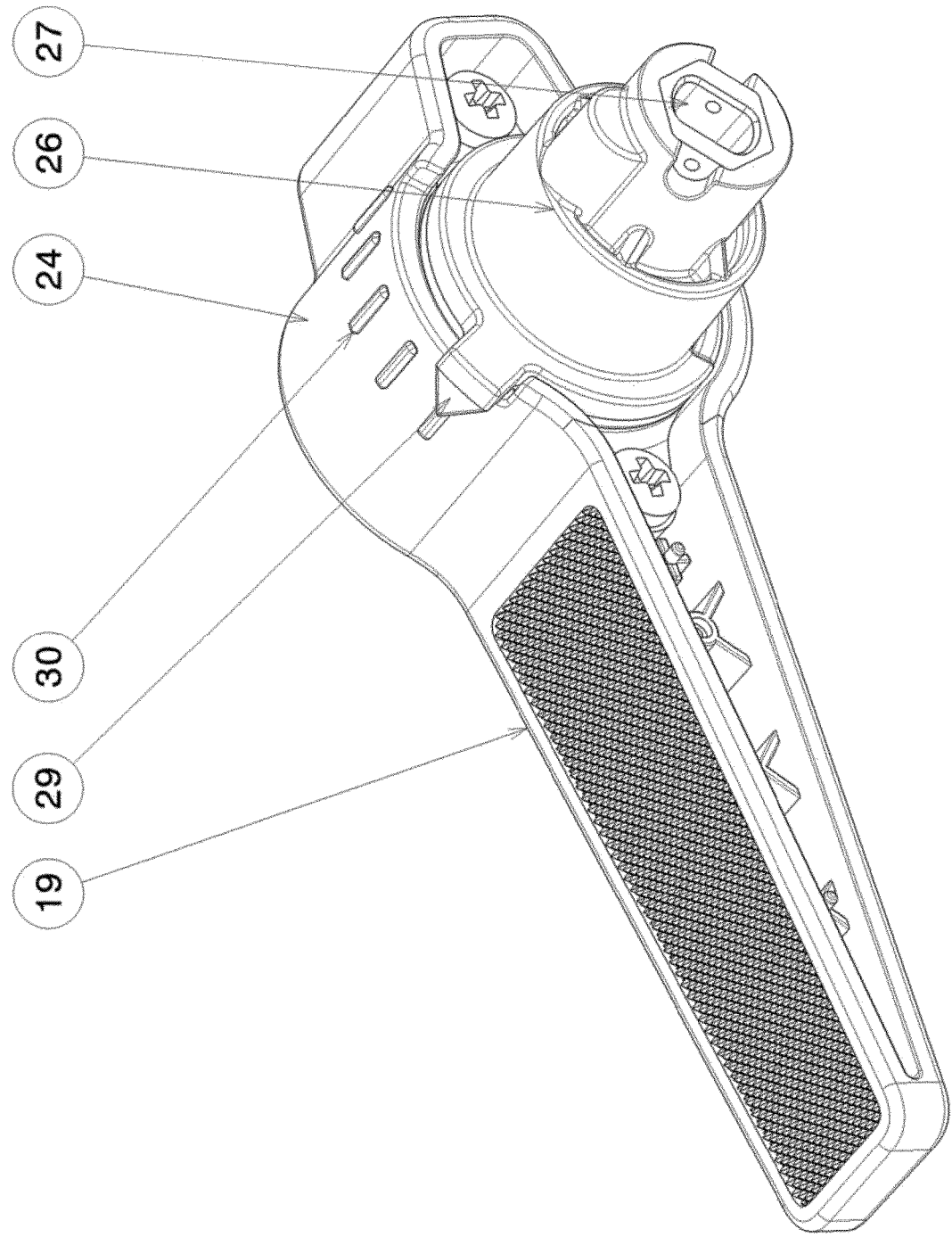
FIG. 7 shows the manual control element in its assembled form.
Figure 8:
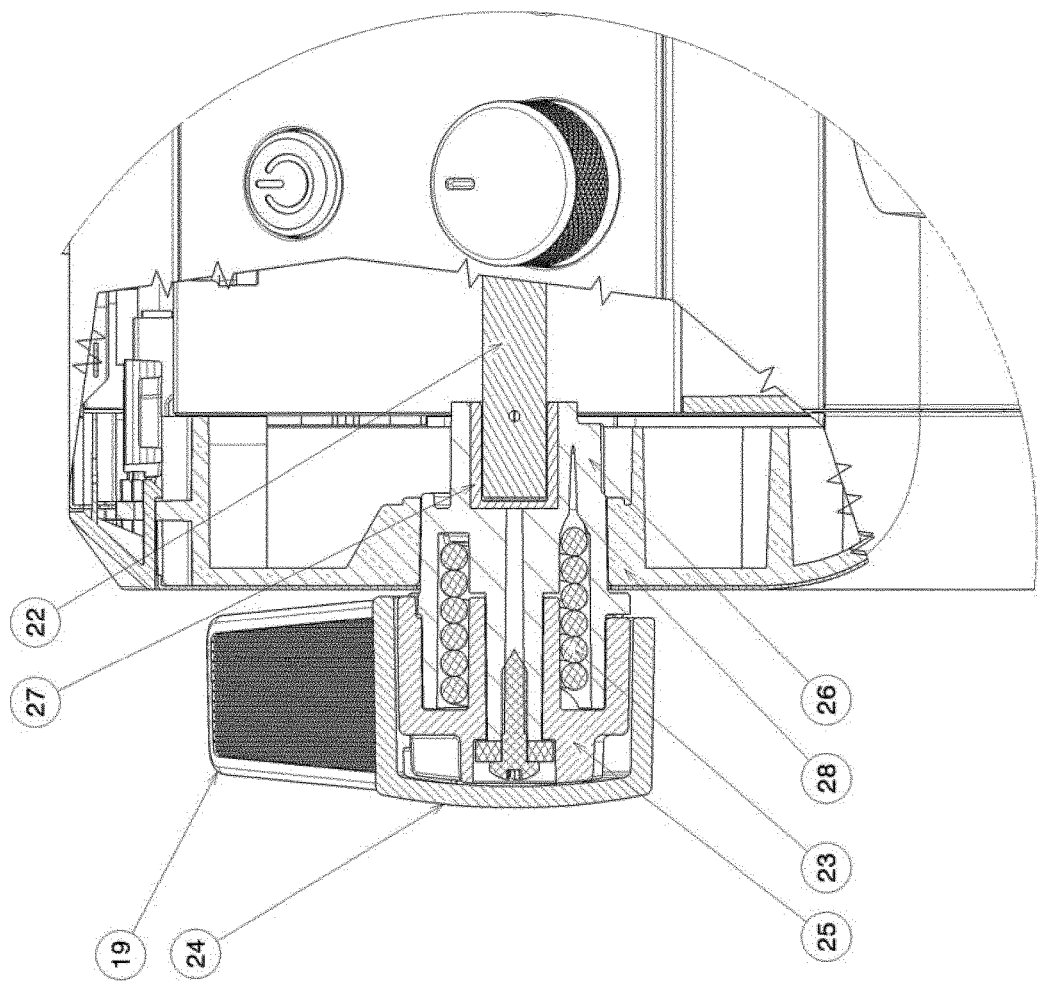
FIG. 8 is a sectional view of the manual control element mounted in the device.

In the first step of the work cycle, the user rotates the control lever 19 in the direction that brings about clockwise rotation of the arch of the cogwheel 21 illustrated in FIGS. 4 and 5. As a result of the meshing with the rack 20, rotation of the arch of the cogwheel 21 causes the stem 18, and jointly the piston 15, to be drawn into vertical translation upwards. This step can advantageously also be automated owing to an automatic return for example with return springs, so as to ensure that at the end of the pressing process, the system returns on its own into the high grinding position.

A microswitch (unillustrated) is activated by one of the moving parts when the piston 15 reaches the upper stroke end, so as to signal the event to the electronic controller, which, as a result of the acquisition of the signal, enables possible activation of the grinder 8.

Once the dose of ground coffee has been dispensed in the cup 3 attached to the support 7, the user can rotate the control lever 19 in the direction which, this time, brings about an anticlockwise rotation of the arch of the cogwheel 21 illustrated in FIGS. 4 and 5. As a result of the meshing with the rack 20, rotation of the arch of the cogwheel 21 causes the stem 18, and jointly the piston 15, to be drawn into vertical translation downwards.

During rotation of the control lever 19 and up until the piston 15 is resting on the upper surface of the dose of ground coffee present in the cup 3, the control lever 19 and the arch of the cogwheel 21 rotate in a manner that is substantially jointly.

However, starting from the moment in which the piston 15, as it is being lowered, compacts the dose of ground coffee present in the cup 3, a further rotation of the control lever 19 can no longer result in further lowering of the piston 15 due to the resistance provided by the compacted dose of ground coffee. In this situation, further rotation of the control lever 19 deforms the torsion spring 23 which transfers a pressing force to the piston 15, said pressing force gradually increasing proportionally to the deformation thereof.

The user stops the control lever 19 in the position in which the indicator identifies the desired degree of pressing force.

At this point, the cup 3 containing the dose of pressed ground coffee powder is separated from the support 7, brought into the area of the coffee machine 1 and attached to the terminal of the brewing unit of the coffee machine 1 for production of the beverage.

Preferably, but not necessarily, before enabling the brewing process, the controller of the coffee machine 1, which incorporates the electronic controller of the device 2, checks whether the user has completed the compression manoeuvre for compressing the dose of ground coffee.

Therefore, with the proposed technical solution the amount of ground coffee is advantageously independent of the pressing process which takes place later by means of the vertical movement of the piston which is lifted during the grinding process so as not to interfere with the ground coffee dropping down towards the cup.

The elastic clutch and the indicator enable the user to control the degree of compression of the coffee as desired, within certain limits, so as to obtain a more or less intense aroma with the dose and particle size of the ground coffee being equal.

The device thus conceived is susceptible to numerous modifications and variants, all of which falling within the scope of the inventive concept. Moreover, all details may be replaced with other technically equivalent elements.

The materials used, as well as the dimensions, may in practice be of any type, according to needs and the state of the art.

The invention claimed is:

1. A device (2) for the preparation of a dose of ground coffee powder comprising:
   a filter holder cup (3) having a filter (4) for the introduction and collection of said dose of ground coffee powder,
   a pressing piston (15) of said dose of ground coffee powder configured for presence at a position within said filter holder cup (3) and at a position above said filter holder cup (3), and
   a lifting mechanism of said pressing piston (15), configured to vertically translate the pressing piston (15) between the position within said filter holder cup (3) and the position above said filter holder cup (3);
   wherein the lifting mechanism includes:
     a control element (19) rotatable about a horizontal axis, the control element (19) comprising an elastic clutch; and
     a transmission configured to transform rotation of the control element (19) about the horizontal axis into vertical translation of the pressing piston (15), wherein the elastic clutch connects the control element (19) to the transmission; wherein the transmission comprises:
       a vertical rack (20) solidly constrained to the pressing piston (15); and
       an arch of a cogwheel (21) supported by the horizontal axis connected to said control element (19) and engaging the vertical rack (20);
   wherein the lifting mechanism is configured, during rotation of the control element (19) and up until the pressing piston (15) is resting on an upper surface of said dose of ground coffee powder present in said filter holder cup (3), so that the control element (19) and the arch of the cogwheel (21) rotate in a joint manner; and is configured, beginning from where the pressing piston (15), while being lowered, compacts said dose of ground coffee powder present in said filter holder cup (3), so that further rotation of the control element (19) no longer results in further lowering of the pressing piston (15), due to resistance provided by compacted ground coffee powder, and so that further rotation of the control element (19) deforms the elastic clutch, which transfers a pressing force to the pressing piston (15), said pressing force gradually increasing proportionally to the deformation of the elastic clutch.

2. The device (2) according to claim 1, wherein said lifting mechanism reversibly activates said pressing piston (15) between a pressing position, wherein said pressing piston (15) is internal to said filter holder cup (3), and said position above said outlet (10) of said slide (9).

3. The device (2) according to claim 1, further comprising a guide (16) for the vertical translation of said pressing piston (15).

4. The device (2) according to claim 1, wherein said pressing piston (15) is rigidly supported by a vertical stem (18) which extends above said pressing piston (15).

5. The device (2) according to claim 1, wherein said pressing piston (15) and said filter (4) exhibit a circular conjugated shape.

6. The device (2) according to claim 1, wherein said elastic clutch comprises a torsion spring (23).

7. The device (2) according to claim 1, wherein said control element (19) is a manual lever or a knob.

8. The device (2) according to claim 1, wherein an indicator (29) of a pressing force is provided which identifies a current configuration of said elastic clutch.

9. The device (2) according to claim 1, wherein selection of the dose of ground coffee powder is independent of a selection of the pressing force.

10. A coffee machine (1) having the device (2) according to claim 1.

11. The coffee machine (1) according to claim 10, further comprising a modular construction composed of structurally independent modules, one of which being formed by said device (2).

12. The device (2) according to claim 1, wherein the control element (19) has a hollow body (24) within which a bearing (25) is fastened, where said bearing (25) is coupled rotatingly with a coaxial bearing sleeve (26), axially having, in turn, a seat (27) for fastening to an axis stem.

13. The device (2) according to claim 12, wherein the elastic clutch is a helical torsion spring (23), interposed along the horizontal axis between the bearing (25) and the coaxial bearing sleeve (26), the torsion spring (23) having one end (23a) fastened to the bearing (25) and one end (23b) fastened to the bearing sleeve (25).

* * * * *